AIRCRAFT TAKE-OFF CARRIAGE AND THE METHOD OF UTILIZING SAME

Filed April 15, 1953 8 Sheets-Sheet 1

Dec. 18, 1956 W. J. JAKIMIUK ET AL 2,774,557

AIRCRAFT TAKE-OFF CARRIAGE AND THE METHOD OF UTILIZING SAME

Filed April 15, 1953 8 Sheets-Sheet 2

AIRCRAFT TAKE-OFF CARRIAGE AND THE METHOD OF UTILIZING SAME

Filed April 15, 1953 8 Sheets-Sheet 3

AIRCRAFT TAKE-OFF CARRIAGE AND THE METHOD OF UTILIZING SAME

Filed April 15, 1953 8 Sheets-Sheet 5

Dec. 18, 1956 W. J. JAKIMIUK ET AL 2,774,557

AIRCRAFT TAKE-OFF CARRIAGE AND THE METHOD OF UTILIZING SAME

Filed April 15, 1953 8 Sheets-Sheet 6

Dec. 18, 1956 W. J. JAKIMIUK ET AL 2,774,557

AIRCRAFT TAKE-OFF CARRIAGE AND THE METHOD OF UTILIZING SAME

Filed April 15, 1953 8 Sheets-Sheet 8

United States Patent Office 2,774,557

Patented Dec. 18, 1956

2,774,557

AIRCRAFT TAKE-OFF CARRIAGE AND THE METHOD OF UTILIZING SAME

Wsiewolod John Jakimiuk and Georges Jules Bernard Victor Hereil, Paris, France, assignors to Societe Nationale de Constructions Aeronautiques du Sud-Est, Paris, France Application April 15, 1953, Serial No. 349,016

Claims priority, application France May 2, 1952

24 Claims. (Cl. 244—63)

The present invention concerns improvements in or relating to aircraft take-off carriages adapted more particularly for use as an auxiliary device for enabling tactical aircrafts to take off from any types of grounds or runways.

The take-off of aircrafts from airfields was effected up to now either by rolling along a runway, preferably a concrete runway, or by catapult-launching. Runways must be long enough to permit the aircraft to attain with certainty its take-off speed before arriving at the ends thereof. Now, the present technical trend is to use planes the take-off speeds of which are increasingly higher and require longer take-off runs and therefore increasingly longer runways.

Consequently, in view on the one hand, of reducing the take-off length and, on the other hand, of permitting a take-off to be effected without specially preparing runways on sufficiently level and firm grounds, suggestions have already been made of providing take-off carriages adapted to enable aircrafts with or without landing gears of the wheel, skid or track type to take off under these conditions. However, the use of these take-off carriages is attended by serious difficulties, notably for hoisting up the aircraft to be launched and positioning it upon the carriage. With certain embodiments, the aircraft has to be placed upon the carriage by means of a crane of the type used for catapulting seaplanes from ships. When these carriages are used on airfields, the crane becomes an essential part of the ground equipment but is extremely difficult to operate, as a rule, and particularly in wartime when these airfields are unprepared, due to the imperative requirement of ensuring a high rate of take-offs. On the other hand, when the take-off carriages are designed for receiving aircrafts of the wheel, skid or track-landing gear type without the assistance of external means, they involve the use of loading-ramps which make them heavy. It is also known that the take-off anchoring and launching means cooperating with the various landing gear portions are rather intricate and therefore liable to mechanical or other failures. Moreover, the assembly constituted by the carriage on which the aircraft rests through its landing gear is an important source of drag involving either a longer take-off run or a higher power consumption.

But, in general, the use of known types of aircraft launching carriages is conditioned by the existence of runways. Now, in war time, such runways have an extreme vulnerability. For overcoming said various drawbacks the present invention has for main object to provide a cross-country assembly for conveying on, and launching from, any type of ground without prior preparation an aircraft having at the most a retractable landing-gear, such an aircraft eventually having no landing-gear.

Another object of the present invention is to provide a conveying and launching cross-country assembly of the character described comprising a cross-country launching carriage on which the aircraft is hoisted up, then fixed while resting on the belly of its fuselage; said carriage having supplemental propelling means usable for the launching operation and braking means, said carriage being further associated with a towing cross-country vehicle usable for displacing said carriage during the hoisting operation and for conveying said carriage to the starting position for launching when said hoisting operation is ended, said vehicle being further used for hoisting the aircraft on the carriage.

Another object of the present invention is to provide a method of utilizing the conveying and launching cross-country assembly of the character described according to which when the towing cross-country vehicle has been rigidly connected to the carriage, the aircraft is hoisted up on said carriage by a rearward displacement of said carriage under the fuselage of the aerodyne; a drivingly interconnection between the carriage and the hoisted aircraft resting on said carriage on the belly of its fuselage is ensured as well as the longitudinal and transversal maintaining of the aircraft on said carriage and the connection of said aircraft to the carriage, then the towing cross-country vehicle is disconnected from the carriage, the propelling means of the carriage is put in action, the connection between the aircraft and the carriage is suppressed when the speed of the carriage supporting the aircraft has reached the desired take-off speed, said carriage then being automatically braked after the aircraft is released from the carriage, while its steering is effected by the driver of the towing cross-country vehicle during the hoisting and conveying periods and by the pilot of the hoisted aircraft during the launching period.

The invention will be better understood from the following description made with reference to the accompanying drawings showing diagrammatically by way of example one form of embodiment of the invention. In the drawings.

Figure 1:
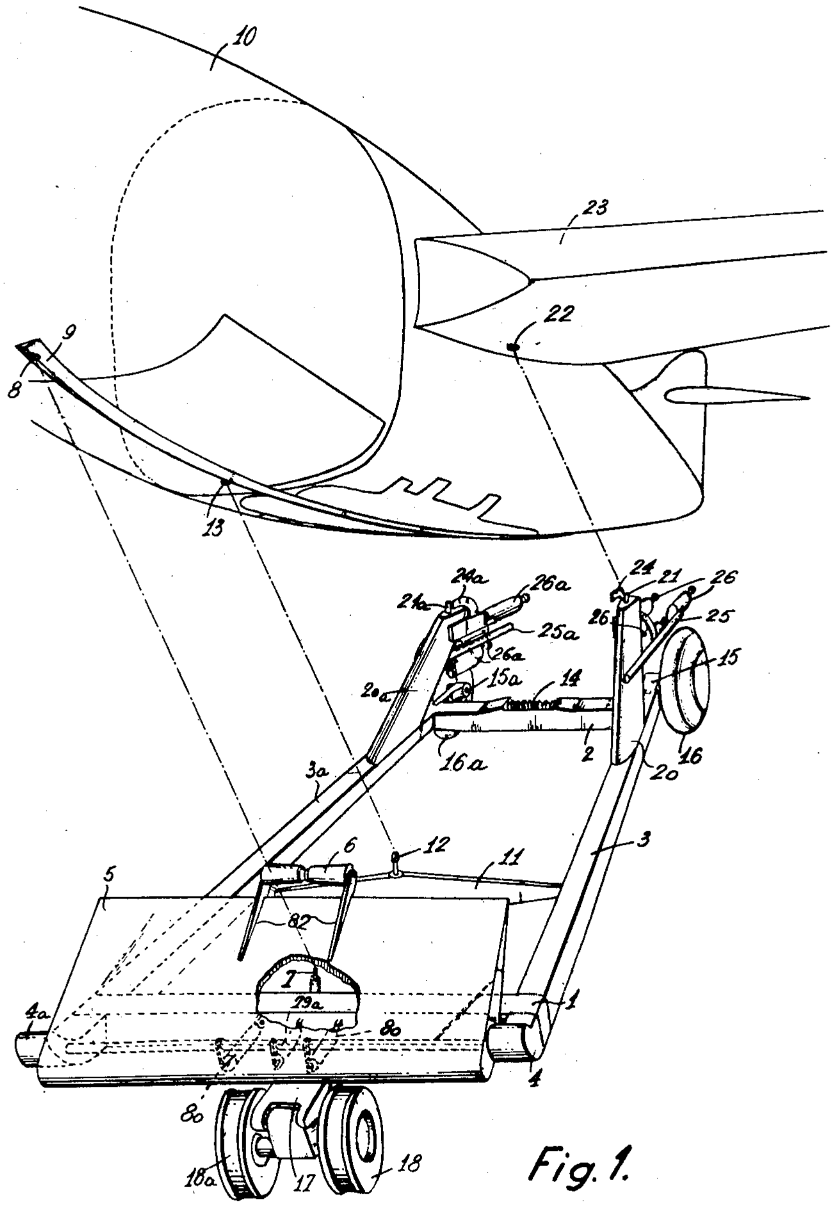
Figure 1 is a perspective view illustrating the carriage according to the invention at the moment in which the aircraft is taking off.

The carriage illustrated generally in Fig. 1 comprises a frame-shaped chassis consisting of a front cross-member 1, a back cross-member 2 and a pair of lateral longitudinal girders 3 and 3*a*. These four members consist of box-sectioned sheet metal parts interconnected through fish-plates (not shown) so that they can be dismantled if necessary. Ahead of the front cross-member 1 are secured a pair of supporting members 4, 4*a* having mounted thereon a flap 5 acting as an aerodynamic- or air-brake and supporting in turn a roller 6. The front cross-member 1 carries internally of the frame structure a pin 7 adapted through engagement into a recess 8 provided in the reinforcing girder 9 of the aircraft 10 to maintain the latter in a longitudinally stable position relative to the carriage. The longitudinal girders 3, 3*a* carry intermediate the cross-members 1 and 2 a central transverse tie member 11 supporting a strap device 12 designed to engage a recess 13 provided in the fuselage of the aircraft 10 beyond the reinforcing girder 9 thereof. The back cross-member 2 carries a central rear roller 14 intended automatically to center the aircraft reinforcing girder during the hoisting operation. This cross-member also carries a pair of arms 15, 15*a* on which are mounted the stub axles of the rear wheels 16, 16*a*. The front cross-member 1 carries an axle having mounted thereon, through the medium of a shock-absorber and a yoke 17, the pair of front wheels 18, 18*a*. At the rear ends of the longitudinal girders 3, 3*a* and ahead of the rear cross-member 2 are mounted a pair of side posts 20, 20*a* inclined slightly inwards of the frame and more pronouncedly rearwards thereof, as shown, these posts carrying driving pins 21, 21*a* adapted to engage corresponding recesses 22 provided in the aircraft wings 23 for drivingly connecting the aircraft to the carriage and vice versa. In addition, these posts support a pair of ramps terminating with hingedly mounted arms 24, 24*a* intended to prevent the aircraft from being deteriorated by the driving pins 21, 21*a* during the take-off proper. These posts have secured thereto a set of tubes 25, 25*a* pointing rearwards and supporting sets of rockets 26, 26*a*.

Figure 2:
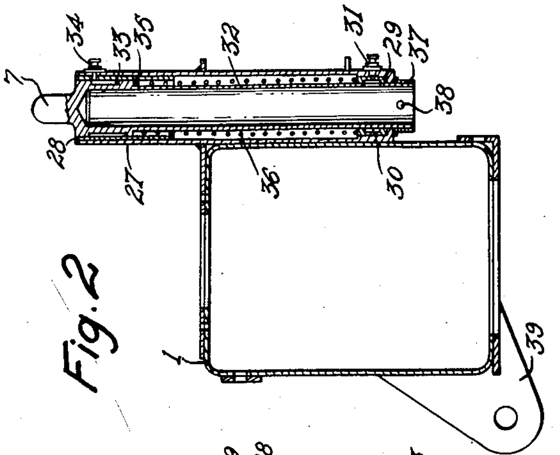
Figure 2 is a central cross-section of the front cross-member of the carriage.

As illustrated in Fig. 2, the front cross-member 1 carries a tubular member 27 having mounted therein a pair of rings 28, 29 fastened by screws (not shown), the ring 29 being provided with a cavity 30 adapted to be fed with lubricant through a grease nipple 31. These rings have slidably mounted therein a hollow pin 32 the upper end of which is formed with a peripheral groove 33 forming together with the upper ring 28 a volume adapted to be fed with lubricant through another nipple 34. This pin 32 is formed with a shoulder 35 engaged by one end of a coil spring 36 the opposite end of which bears against the lower ring 29. The pin 32 is held in its proper vertical position by an abutment ring 37 secured by a pin or bolt 38. The upper end of this pin has a rounded portion 7 to facilitate its ingress into the corresponding recess 8 formed in the aircraft fuselage or keel. The front face of the cross-member 1 carries a lug 39*a* for attaching the corresponding connecting element of the coupling device as will be made clear presently.

Figure 3:
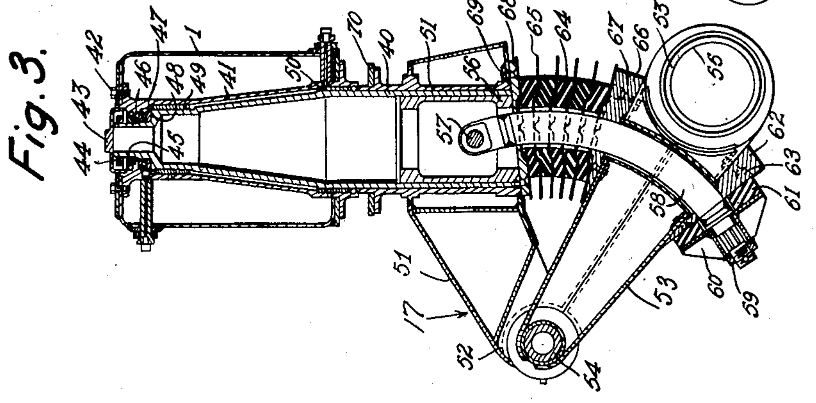
Figure 3 is a vertical section of the front wheel mounting.

The front cross-member 1 carries the front set of wheels (see Fig. 3). This set comprises a steering pin 40 having a tapered upper portion located in a casing 41 secured to the cross-member 1 through a set of screws 42 and closed by a cap member 43. This steering pivot pin 40 is held by castle nuts 44, 45 engaging a bronze or like bearing 46 carried by the casing 41. This casing has fitted therein a thrust bearing 47 engaging a shoulder 48 formed on the steering pivot pin, the latter being centered in the casing through a pair of bushings 49, 50. The lower portion of the steering pivot pin has mounted thereon an upper arm 51 having a front extension 52 of U-shape for forming yoke 17 which is hingedly connected to a lower arm 53 through a hollow shaft 54. The lower arm 53 has formed therein a bore 55 receiving the stub axle on which both front wheels 18, 18*a* are mounted.

Inside the lower portion of the steering pivot pin 40 there is fitted a hollow socket 56 having mounted therein a pin 57 the ends of which are fastened to the upper arm 51. This pin 57 carries an arc-shaped rod 58 the bottom threaded end of which is engaged by a screw nut 59 for securing a member 60 on which a rubber pad 61 is fixed in any known and suitable manner. This pad normally engages a wedge-like member 62 fastened through screw means 63 to the underside of the lower arm 53, when the carriage is empty and on a level ground. The arc-shaped rod 58 extends through the central apertures of a set of rubber disks 64 of obliquely-truncated shape, stacked together and separated by interleave metal washers 65. The stacking of disks 64 and washers 65 is located between another wedge-like member 66 secured to the lower arm 53 through bolts 67 and an abutment plate 68 fastened beneath the upper arm 51 through a set of screws 69. This upper arm also carries a cam member 70 adapted, through actuation of a locking device (not shown), to hold the steering assembly in the straight ahead position at the time when the aircraft takes off from the carriage. The rubber pad and disks 61, 64 act as damping elements adapted to smooth out the shocks originated by the ground unevennesses and transmitted through the wheels 18, 18*a* to the lower arm 53.

Figures 4, 5, 7:
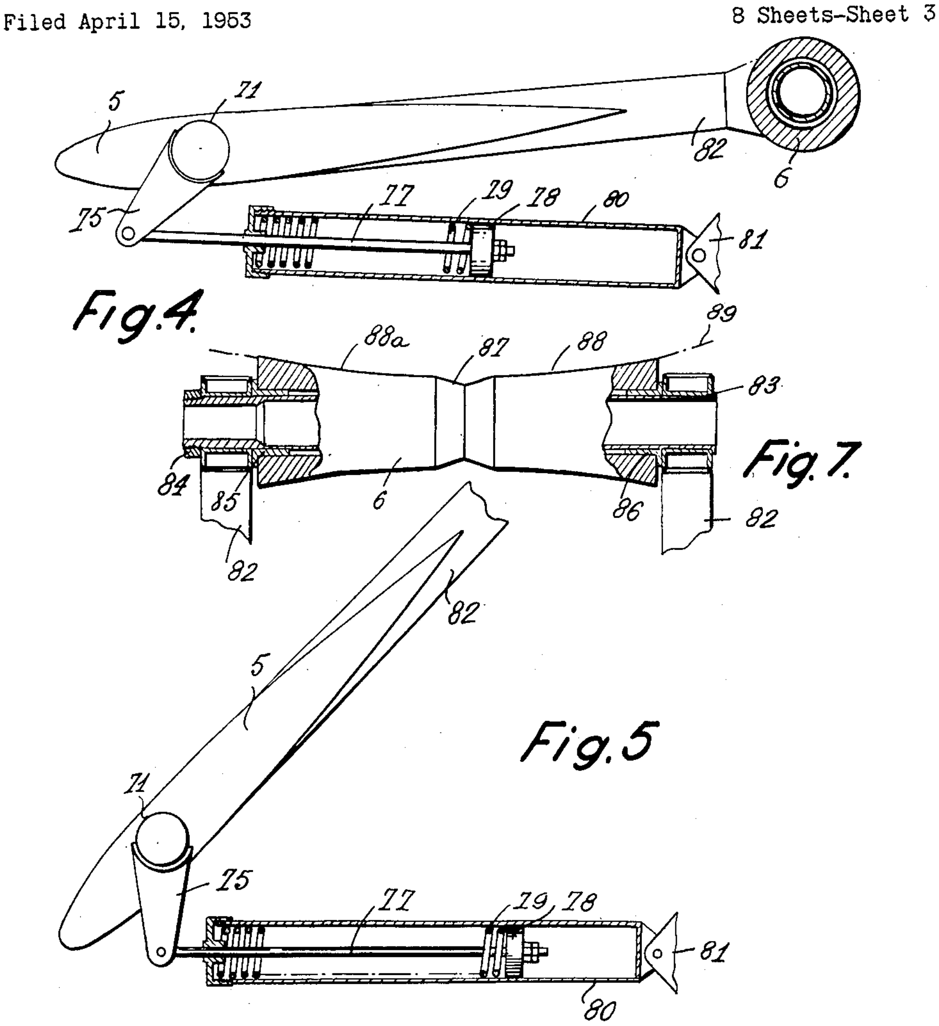
Figure 4 is a part-sectional lateral view of the air-brake with the resilient return means associated thereto, showing the positions of the various parts when an aircraft rests upon the carriage.
Figure 5 is a view similar to Fig. 4 showing the same parts when the carriage is empty.
Figure 7 is a part-sectional view showing the mounting of the front roller.
Figure 6:
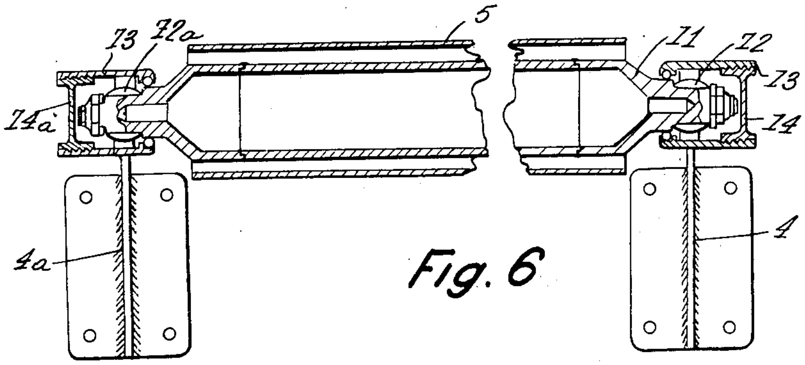
Figure 6 is an axial sectional view of the air-brake.

As illustrated in Figs. 4, 5 and 6, the flap 5 acting as an air-brake is mounted on a hollow shaft 71 carrying at either end a ball member 72, 72*a* mounted in a casing 73, 73*a* closed endwise by a screw plug 74, 74*a* and supported by an adequate bracket 4, 4*a* both brackets being fastened to the front face of the front cross-member 1.

The flap 5 is provided with a pair of parallel strap-shaped members 82 having fitted therein a shaft formed with a retaining head or shoulder 83 at one end and carrying a fastening nut 84 at the other end. This shaft has rotatably mounted thereon the front roller 6, a pair of suitable bushings 85, 86 (see Fig. 7) being provided for this purpose. The profile of this front roller comprises a central portion 87 constituted by a pair of converging tapered surfaces, i. e. joined through their smaller ends, intended to support the fuselage or the reinforcing girder of the aircraft, and a pair of outer portinos 88, 88*a* the profiles of which correspond in shape to the cooperating profile of the aircraft fuselage, which is indicated diagrammatically by the chain-dotted line 89.

The streamlined flap 5 is rigid with a pair of lateral levers 75, 75*a* fastened to the shaft 71 in the plane of the strap-shaped members 82. These levers are hinged connected to a pair of rods 77 the opposite ends of which are rigid with pistons 78 to which the resilient force of return compression springs 79 is applied as shown. These springs are located in tubular casings 80 pivotally connected to lugs 81 welded or otherwise made integral with the front cross-member 1. In the empty-carriage position illustrated in Fig. 5, the springs are pre-stressed and the flap 6 abut forwards so as to resist the antagonistic force resulting from the air impinging on the flap when the carriage is in motion. When the aircraft is being hoisted up and at nearly the end of this operation, the front portion of the aircraft, by engaging the supporting roller 6, moves the flap to the substantially horizontal position in which it is shown in Fig. 4. The spring 79 is therefore compressed and will restore the flap 6 to its raised position (Fig. 5) when the aircraft leaves the carriage at the end of a take-off. This return movement is retarded by the provision of a dash-pot 79*a* secured centrally of the front cross-member 1 and connected to a lever similar to the levers 75, 75*a* carried by the shaft 71. The action exerted by this dash-pot prevents the flap from rising too abruptly when the aircraft leaves the carriage, as a quick raising of the flap is likely to develop a nose-lifting moment in the aircraft. The relative arrangement of the springs 79 and rods 77 is so calculated that the hinge moment is substantially identical in both outermost positions of this flap.

Behind the front cross-member 1 and at about the third of the carriage length, a rhombus-shaped intermediate cross-tie 11 connects the side girders 3, 3*a* with each other.

Figure 8:
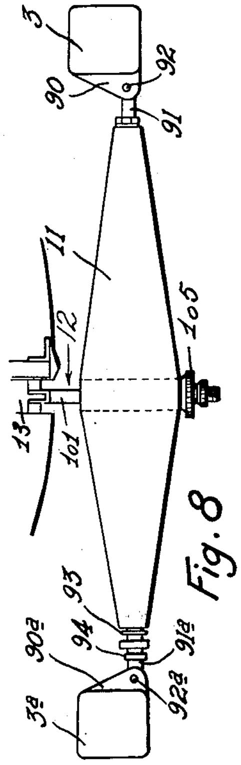
Figure 8 is an elevational view showing the transverse member supporting the device for connecting the aircraft to the carriage.

This cross-tie is fastened at one end to a strap-forming pair of lugs 90 carried by the inner face of the corresponding girder 3, by means of an end piece 91 and a pin 92 (see Fig. 8). The other end of the cross-tie 11 is fastened in a similar fashion to lugs 90*a* carried by the inner face of the relative side girder 3*a* with the assistance of an end piece 91*a* adjustable in length by means of nuts 93, 94, this end piece being mounted on the pair of lugs 90*a* through a pin 92*a*. Slightly off-set on the left when looking from the front end of the carriage is a tubular casing 95 extending vertically through the cross-tie 11; this casing 95 is reinforced externally by another tubular member 96 (see Fig. 9). The inner casing 95 has fastened to its lower end, for example by welding a seat member 97 formed with a flange 98 fastened to the underside of the intermediate cross-tie 11; this seat member 97 also comprises a part-spherical machined seat surface 99 and a shoulder portion 100.

In this assembly, there is mounted the strap device 12 comprising a tubular rod 101 provided with a strap-shaped upper head 102 in which a pin 103 is engaged permanently. This tubular rod 101 has a threaded lower end 104 engaged by a knurled nut 105 formed with an upper part-spherical portion 106 corresponding to the part-spherical seat 99. A compression spring 108 is interposed between the upper face 107 of the nut portion 106 and the shoulder 100.

Figure 9:
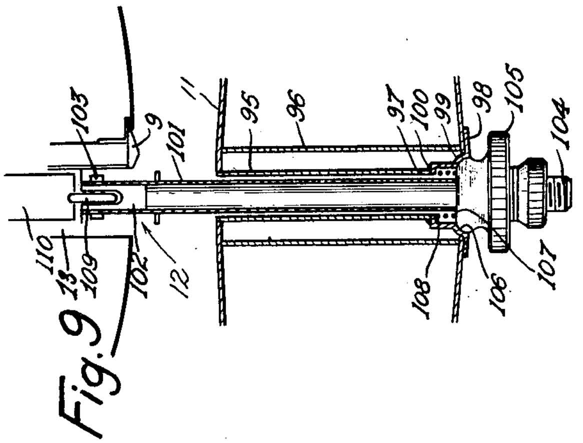
Figure 9 is a detail sectional view showing at a greater scale the connecting device of Fig. 8.

When the aircraft is being loaded on the carriage, the tubular rod 101 normally urged downwards by the spring 108 is then pushed upwards by hand through actuation of the knurled nut 105 until a hook element 109 pertaining to a release device 110 provided on the aircraft engages automatically the strap pin 103. As a substantial clearance is provided between the tubular rod 101 and its tubular guide casing 95 and due also to the provision of the part-spherical seat 99 and 106, this hooking operation will take place irrespective of the possible variations in the relative positions of the release device and the geometrical axis of the tubular casing 95. The strap-shaped head 102 engages a hole 13 formed in the bottom of the fuselage laterally of the reinforcing girder 9 of which the bottom flange may be reduced in this zone, if desired, as shown in Fig. 9.

Figures 10, 11, 12, 13, 14:
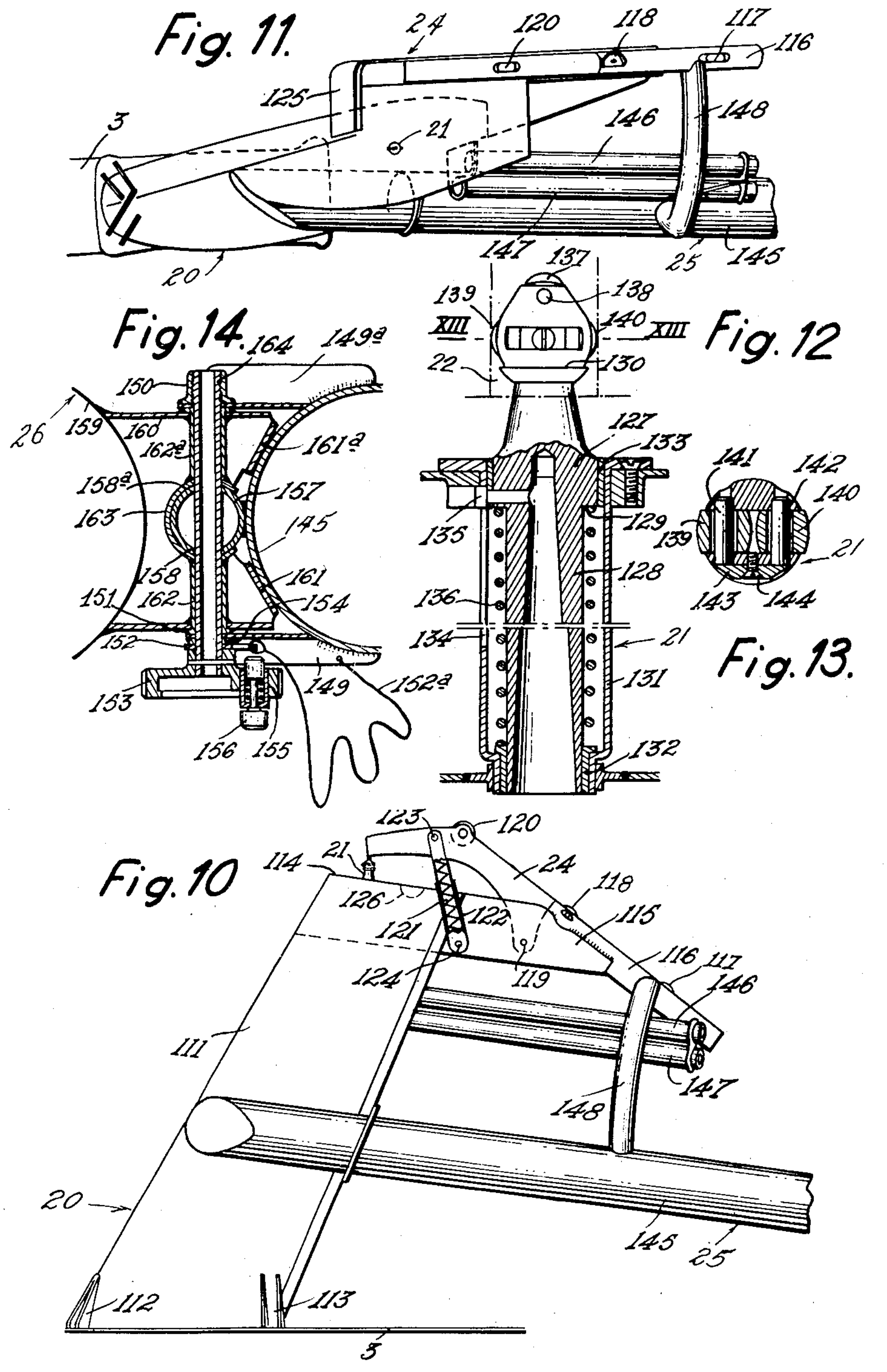
Figure 10 is an elevational view showing one of the rear posts.
Figure 11 is a plane view of the rear post illustrated in Fig. 10.
Figure 12 is an axial sectional view showing one of the roller driving pins.
Figure 13 is a section taken upon the line XIII—XIII of Fig. 12.
Figure 14 is a sectional view showing the device for quickly mounting the rockets.

Adjacent the rear ends of the longitudinal girders 3, 3*a* and ahead of the back cross-member 2 are mounted a pair of side posts 20, 20*a*. Each post as illustrated in Figs. 10 and 11 comprises a body 111 of pressed welded sheet metal elements which is secured by brackets 112, 113 on the corresponding longitudinal girder 3 and closed at the top by an end plate 114. These posts are inclined rearwards of the frame structure and converge inwards; the top plates 114 are also inclined towards each other and support the driving pins 21 described hereafter.

These posts carry a lateral internal and box-sectioned extension 115 supporting at its rear end a tubular ramp 116 having mounted therein a pair of rollers 117, 118 for guiding the aircraft wings and fuselage during the hoisting and take-off operations. This ramp has an upward and forward extension 24 hingedly mounted at 119 and carrying another guiding roller 120. This extension device is normally held above the driving pin 21 by a compression spring 121 housed in a casnig 122 pivotally mounted at 124 on the extension member 115 and at 123 on the extension member 24. At its forward end the extension member 115 terminates with a transverse plate 125. When the aircraft is being hoisted up, it is guided by the rollers 118 disposed symmetrically, and then the wing bears on the roller 120 thereby progressively depressing the hinged device 24 and compressing the spring 121, the roller 120 engaging a suitably shaped notch or recess 126 formed in the lateral extension 115. At the same time, the driving pin 21 engages a recess 22 provided in the wing 23 of the aircraft after contacting this wing through the driving pin roller 137 (see Fig. 12).

Preferably, the driving pins 21 and 21*a* are constructed in the manner shown in Figs. 12 and 13. Each driving pin comprises a body 127 provided with a lightened shank 128 formed with a bearing shoulder 129 and a substantially spherical head 130. The body 127 is movably mounted through a pair of bushings 132, 133 in a substantially cylindrical casing 131 having formed in its lateral wall a longitudinal guiding slot 134 for a screw or like guide pin 135 rigid with the body 127 and acting both as a guiding member and as a vertical abutment part. A return spring 136 is contained in the casing 131 and bears at one end against the aforesaid shoulder 129 and at the opposite end against a flanged ring 132.

The head 130 is machined for mounting therein an upper roller 137 emerging from this head and rotating on a pin 138, and a pair of side rollers 139, 140 also emerging from the spherical head surface and rotatably mounted on pins 141, 142 fitted in the head 130 and retained by a plate 143 fastened by means of a screw 144. The thus constructed driving pins will therefore permit the relative movements between the wings and driving pins without deteriorating the wings, both when hoisting the aircraft onto the carriage and when the aircraft takes off, as the only engagements produced are rolling contacts between the wing surfaces and the rollers 137, 139 and 140. At the end of the hoisting operation, the wing bears on the roller 137 and compresses the spring 136 until the recess 22 registers with the driving pin; then the spring 136 pushes the pin into the recess (shown in chain-dotted lines in Fig. 12). This recess is dimensioned to account for variations in the aircraft incidence during the take-off.

In those periods where it is the carriage that drives the aircraft, the roller 139 bears against the wing; on the contrary, when the aircraft drives the carriage the former bears on the roller 140.

Each post 111 carries, on its outer face, a set of tubes 25 comprising a tubular member 145 inclined downwards and externally of the carriage, and a pair of parallel tubes 146, 147 on its rear face, parallel to the aforesaid tube 145. All said tubes are connected through a short tubular reinforcing member 148 to the ramp 116 and are utilized as rocket-carrying racks. The rockets are divided into two groups of three, one group per post, each group comprising, on the one hand, a rocket fastened on the tube 145 externally of the frame structure of the carriage and behind the corresponding rear wheel and, on the other hand, a pair of rockets secured on the tubes 146 and 147, one above the other and internally of the frame structure.

The rockets are mounted on the supporting tubes by means of the sliding connecting device illustrated in Fig. 14. Each tube 145, 146 or 147 is provided at its rocket-carrying place with a pair of U-shaped brackets 149, 149*a*. The web of bracket 149*a* carries an internally threaded socket 150. Similarly, the other bracket 149 carries in its web portion a plain-bored socket 154. There is fixed along each tube a guide tube 157 provided with two diametrally opposite apertures 158, 158*a*. The rocket 159 is provided, on the one hand, with a mounting piece consisting of a box-sectioned member 160 made of bent and welded sheet metal elements having two oblique walls 161, 161*a* and supporting two cylindrical sockets 162, 162*a* fast with a tubular member 163.

On assembling the parts, the tubular member 163 is caused to slide over the guide tube 157 and the oblique walls 161, 161*a* engage the inner surface of the supporting tube 145. A tubular pin 164 passes through the plain-bored socket 151, the cylindrical socket 162, both apertures 158, 158*a*, the other cylindrical socket 162*a* and is finally screwed in the screw-threaded socket 150. This pin 164 carries a knurled operating head 153 having mounted in an eccentric bore 155 thereof a spring-loaded bolt 156. This head carries a plate 152 to which one end of a chain or like fastening means 152*a* is attached the other end of which is attached to the bracket 149 to avoid the loss of the tubular pin 164. The spring-loaded bolt 156 is retracted when the pin 164 is fitted into the device and then it can be used as a crank pin. After assembling the parts, this bolt is released and acts as a locking means against rotational movements through engagement thereof with the wings of the U-shaped bracket 149.

Figures 15, 16:
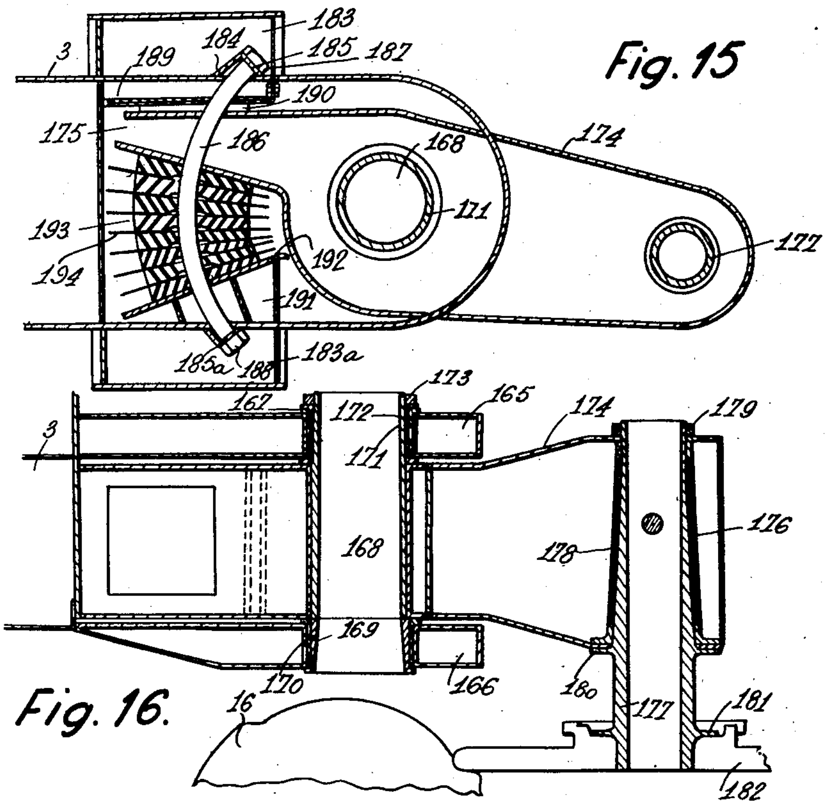
Figure 15 shows in elevational and part-sectional view the rear suspension of the carriage.
Figure 16 is a plane view corresponding to Fig. 15.

The longitudinal girders 3, 3*a* are formed at their rear ends with a box-like assembly made of bent and welded sheet-metal elements forming together a yoke the arms 165 and 166 of which (see Fig. 16) are also box-shaped and provided with bores in which half-collars 167 are fitted. These half-collars receive a hollow shaft 168 formed at one end with a tapered inner bearing surface 169 on which a bushing 170 fitted in the half-collars 167 of the arm 166 is mounted, and at the other end with a cylindrical bearing surface 171 having fitted thereon a bushing 172 located in the half-collars 167 of arm 165, the assembly being held against axial motion by a screw nut 173. The shaft 168 has rotatably mounted thereon a lever 174 made of bent and welded sheet metal elements. This lever is provided with a dihedral shank portion 175 which in the inoperative condition has one side substantially horizontal whilst the other or opposite side is positioned in a plane passing through the center axis of shaft 168 (see Fig. 15). The opposite end of this lever carries a tapered sleeve 176 in which a hollow shaft 177 having a tapered bearing surface 178 is fixed by means of a nut 179 cooperating with a flange 180. This shaft 177 is provided with another flange 181 engaged by the central disk 182 of the corresponding rear wheel 16 or 16*a*.

On the upper and lower faces of the longitudinal girder 3 or 3*a* there are fastened two members 183 and 183*a* made of bent welded sheet metal elements. Each of these members is provided with an internal pressing 184 forming a flat surface 185 directed towards the axis of shaft 168. Between the flat surfaces 185 and 185*a* there is mounted an arc-shaped rod 186 centered about the axis of shaft 168 and held in position by a head 187 and a nut 188. Between a small case 189 positioned beneath the upper wall of the longitudinal girder 3 and the upper wall of the dihedral arm 175, there is fixed a pad 190 of resilent material such as rubber, the rod 186 extending across this pad. On the inner wall of the longitudinal girder 3 there is fastened a box-like structure 191 the upper wall 192 of which is inclined and positioned in a plane passing through the axis of shaft 168. Between this wall 192 and the upper wall of the dihedral arm 175 are located a plurality of rubber disks 193 of obliquely-truncated shape; these disks are stacked upon one another and separated by metal washers 194. The arc-shaped rod 186 extends through the rubber disk and metal washer assembly acting as a damping means against the shocks originated by ground unevennesses and transmitted through the wheels 16, 16*a* to the lever 174.

The rear wheels 16, 16*a* of the carriage, as well as the front wheels 18, 18*a* are fitted with low-pressure tires so that the carriage can be displaced on any grounds without preparing the runway and notably on ploughed grounds provided the tires are partly deflated beforehand.

Figure 18:
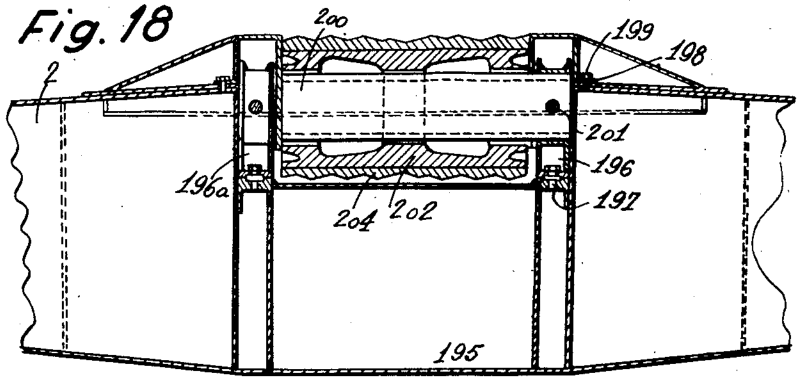
Figure 18 is a sectional view taken upon the line XVIII—XVIII of Fig. 17.
Figure 17:
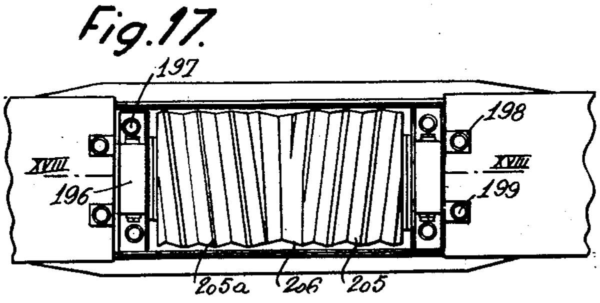
Figure 17 is a plane view showing the back cross-member equipped with the rear centering roller.

The rear cross-member 2 carries intermediate its ends the rear guide roller 14. This cross-member, as shown in Figs. 17 and 18, comprises a central box-like element 195 on which a pair of bearings 196 and 196*a* are mounted by means of screws 197; in addition, these bearings carry lugs 198 fastened by means of screws 199 on the upper wall of the cross-member 2. In the bearings 196 and 196*a* is mounted a tubular shaft 200 retained against axial displacement therein by a pair of pins or bolts 201. This shaft has mounted thereon the roller 14 comprising a body 202 of lightened steel cooperating with a pair of friction bushings 203 and provided with an outer shrunk sleeve 204 of light alloy. This light alloy sleeve is formed with two series of helical grooves 205 and 205*a* of opposite pitches intended automatically to bring the reinforcing girder 9 of the aircraft into the central portion 206 of the roller, the profile of these helical grooves and central portion corresponding to that of the girder. According as the reinforcing girder engages the helical grooves 205 or 205*a* during the hoisting operation, the roller 14 will roll and bring automatically this reinforcing girder to the central position 206.

Figures 19, 20, 21:
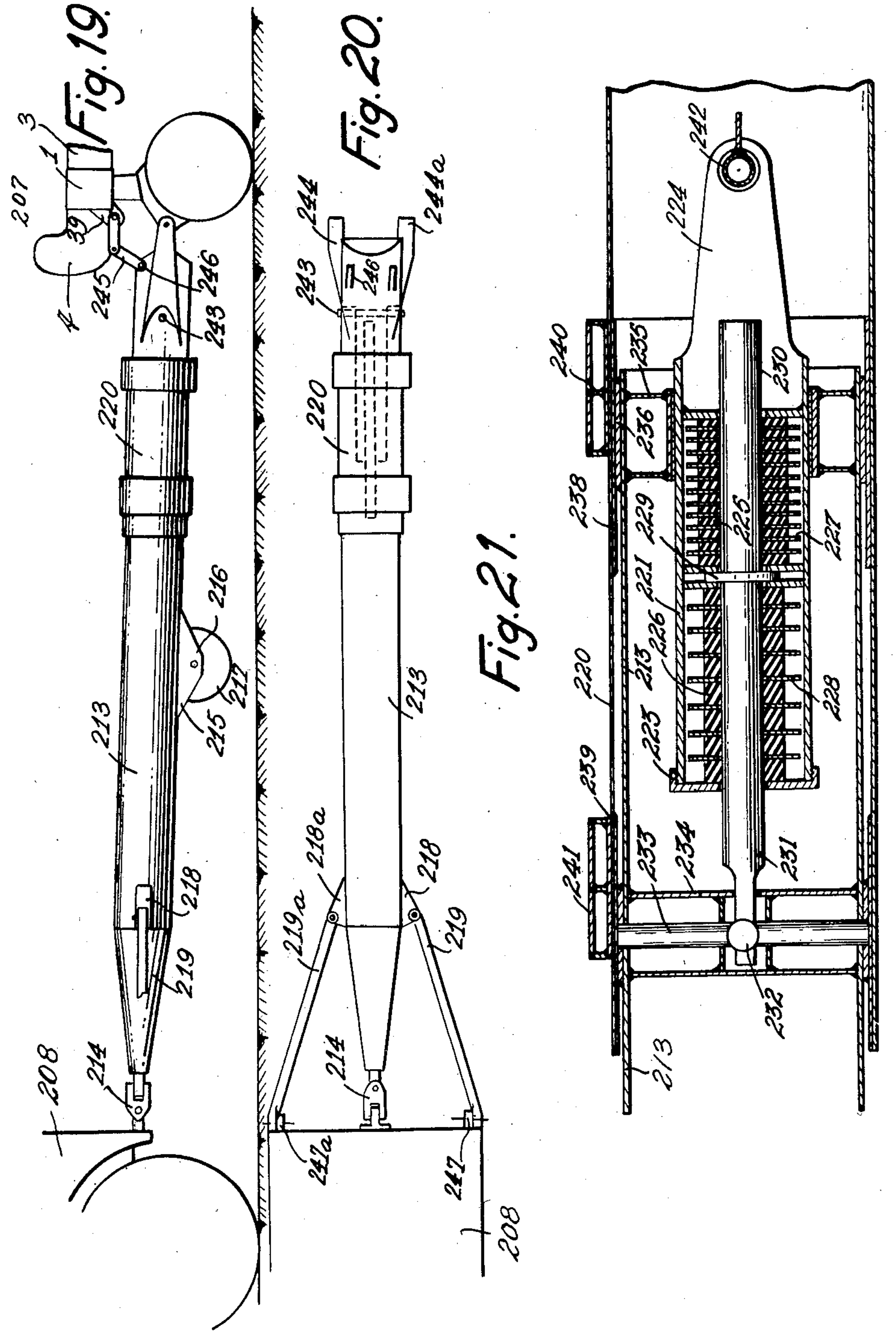
Figure 19 is an elevational view showing the draw-bar device for attaching the carriage to an all-ground vehicle.
Figure 20 shows the draw-bar device in plane view without the linkage for locking the steering of the carriage front wheels in the straight ahead position.
Figure 21 is an axial sectional view showing at a greater scale the carriage-connected end of the draw-bar device.

Figures 19, 20 and 21 illustrate the device for coupling the all-ground vehicle to the carriage 207. This device consists of a tubular beam 213 of which one end is connected through a universal joint device to the vehicle frame, device comprising a cardan yoke 214 having two axes at right angles to each other. The tubular beam has fixed on its underside a pair of yoke-forming vertical arms 215 adapted to support the axle 216 of a wheel 217 for towing the coupling device when the latter is not attached to the take-off carriage. The tubular beam 213 is provided, adjacent to its end connected to the towing vehicle, with a pair of lateral straps 218, 218*a* having pivotally mounted thereon a pair of side arms 219, 219*a* normally held in a rearward position alongside the tubular beam body 213, i. e. pointing towards the wheel 217. When the aircraft is about to be hoisted up on the carriage, these arms are unfolded and their free ends are fastened to the towing vehicle by means of suitable lock pins attached through chains (not shown) either to the vehicle or to the arms themselves.

The tubular beam 213 is attached to the carriage through a pivoting and sliding device associated to a shock-absorber operating in both directions. This pivoting and sliding device comprises an outer tubular sleeve member 220 surrounding the end of the tubular beam 213 and a damping assembly located inside this tubular beam 213 and connected to this outer sleeve member. The damping device consists of a casing 221 provided with a fixed bottom 222 closed by a screw cap 223 and extending beyond the fixed bottom 222 through a yoke forming portion 224. In this casing 221 are disposed two series of rubber disks 225, 226 separated by interleave metal washers 227, 228, each series of rubber disks 225, 226 being located one on each side of a piston 229 fast with a piston rod 230. One end of this piston rod 230 emerges from the casing 221 beyond the fixed end plate 222, and the other end 231 has a thinner terminal portion having mounted therein a ball element 232 rigid with a cross-shaft 233 the ends of which are retained in and by the walls of the tubular beam 213, this cross-shaft being reinforced by the provision of a plate structure 234 fastened inside this tubular beam. The casing is adapted to slide axially through a composite guiding structure 235 secured inside the outer end of the tubular beam 213.

Between the tubular beam 213 and the sleeve member 220 are inserted friction linings 236, 237 fast with the tubular beam and other friction linings 238, 239 fast with the sleeve member 220. This sleeve member is reinforced externally by a pair of composite hoop members 240, 241 registering with the linings 238 and 239 respectively. The two arms of yoke 224 are interconnected by a tubular bracing socket 242 having fitted therein a shaft 243 through which the yoke is connected to the outer sleeve member 220. This shaft 243 is surrounded by reinforcing members located between the arms of yoke 224 and this sleeve member 220. This sleeve member 220 has fixed to its outer or rear end another yoke structure consisting of a pair of sheet-metal arms 244, 244*a* welded to the sleeve member 220. The purpose of this yoke is to connect the sliding sleeve member 220 to the shaft 54 of the shock-absorber device of the front axle. This sleeve member 220 carries at its end a linkage 245 pivotally mounted at 246 and adapted to be attached through its free end to the strap 39 carried by the front cross-member 1 of the carriage, in order to lock the front axle steering in a straight ahead position relative to the carriage proper when the aircraft is being hoisted up.

The sliding and swiveling end piece constituted by the sleeve member 220 and the rubber disk shock-absorber, due to the oscillation of the rod 230 about the ball element 232 enables the carriage to be tilted transversely relative to the towing vehicle. During the hoisting period the damping action is provided by the piston 229 which compresses the rubber disk stacking 225 and during the towing period, this action is ensured by the same piston but against the other rubber disk stacking 226.

Figure 22:
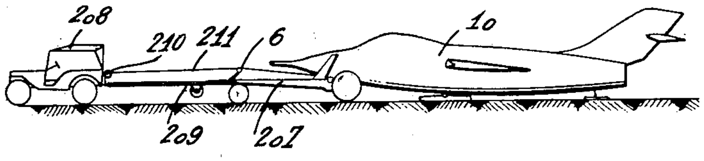
Figures 22 to 25 are diagrams illustrating the various steps taking place when hoisting an aircraft on the carriage according to the invention.

The carriage and the coupling means therefor as described hereinabove, are utilized as follows for hoisting an aircraft preparatory to the take-off:

Firstly, if the aircraft is provided with a landing gear, the tail-skid is locked or braced by means of a cross-tie lying on the ground to prevent the aircraft from tilting laterally. Then the carriage 207 is coupled to an all-ground vehicle 208 through the attachment 209 the arms 219, 219*a* of which are anchored to the corresponding fittings 247, 247*a* of the towing vehicle, the linkage 245 being bolted in the strap 39. The towing vehicle is equipped with a winch 210 the rope 211 of which is secured to a suitable point 212 of the aircraft and passed over the front roller 6 of the carriage (see Fig. 22). The brakes of the vehicle and carriage are released.

Figure 23:
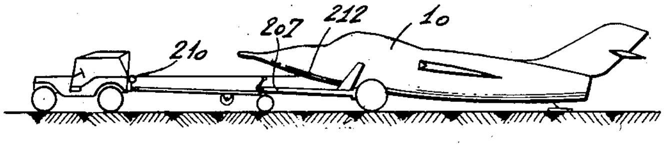
Figure 24:
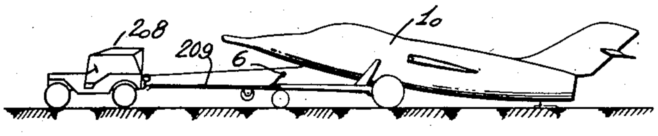

As the winch is set in motion, the towing vehicle 208 coupled to the carriage 207 moves backwards and the latter creeps under the fuselage of the aircraft (Figs. 23 and 24). The fuselage bottom engages the carriage through the centering roller 14. The carriage begins to lift the aircraft. At this time, the main landing gear is retracted by actuating an automatic control or a control actuatable from the ground. This shows that the manoeuvring and utilization of the assembly are completely independent of the type of landing gear, whether of the wheel, skid or track type, with which the aircraft is equipped. Then, the aircraft is centered by the backward movement of the carriage on the latter by the rear roller 14 and guided by the rollers 118. As the carriage recedes beneath the aircraft the latter is lifted and when the carriage roller 14 passes beyond the center of gravity of the aircraft the aircraft tail is raised and the nose dives forwards, thereby causing the pivotally mounted members 24, 24*a* to collapse. Subsequently, the front portion of the fuselage bears upon the front roller 6 carried by the air-brake flap 5. The spring means 79 associated therewith damp out the shock resulting from this tilting movement until the flap 5 is abutted horizontally. At this time, the driving pins 21, 21*a* engage the corresponding recesses 22 provided in the aircraft wings 23 and the front pin 7 penetrates into the cavity 8 formed in the reinforcing girder 9. By rotating the screw nut 105 the rod 101 is raised while compressing the spring 108 so that the strap device 12 engages the cross pin 103.

Figure 25:
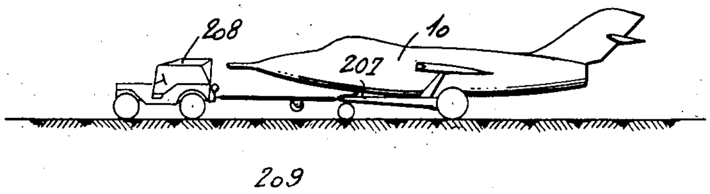
Figure 26:
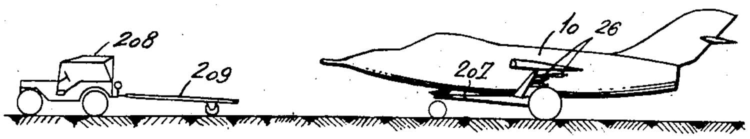
Figure 26 is a similar diagram showing the aircraft positioned on the carriage and ready for the take-off, the towing vehicle having been disconnected.
Figure 27:
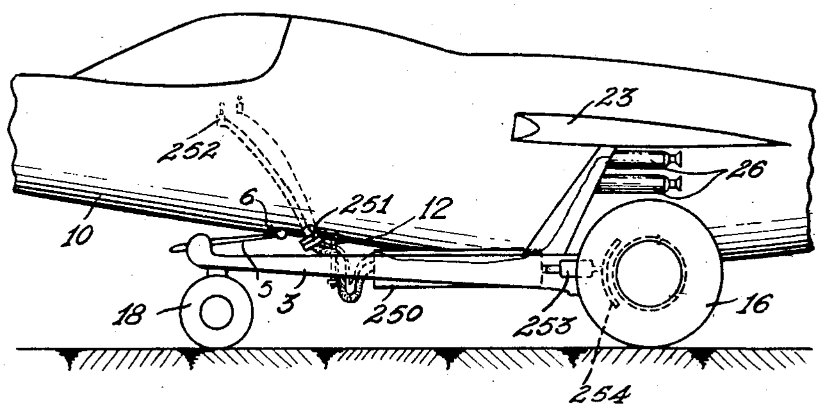
Fig. 27 shows diagrammatically the connections existing between the carriage braking device and the rockets, and the hoisted aircraft.
Figure 28:
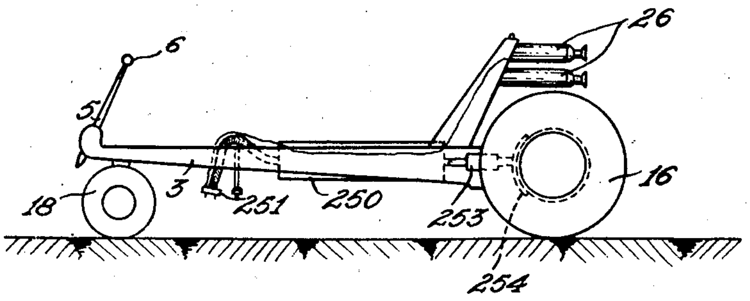
Fig. 28 shows diagrammatically the remaining parts of said connections when the aircraft has taken off.

After these successive steps the aircraft is positioned on the carriage in the manner illustrated in Fig. 25, with the reinforcing girder engaging both the rear roller 14 and the front roller 6, the latter being lowered with the flap 5. After this loading the towing vehicle 208 is positioned as shown in Fig. 25 relative to the aircraft and the latter can be moved to the desired launching place. For this purpose, the two side arms 219, 219*a* are released from the towing vehicle and the linkage 245 is released from the carriage. The winch rope 211 is disconnected from the aircraft and wound on its drum. Thus, the assembly consisting of the towing vehicle, the carriage and the aircraft carried thereby constitutes a perfectly hinged rolling unit adapted to move over any ground and distances. When the aircraft is ready for the take-off, the coupler is released from the front axle of the carriage and lies on its supporting wheel 217; thus, the towing vehicle can be cleared from the take-off line (Fig. 26). Meanwhile, all the carriage devices to be controlled by the aircraft pilot, i. e. the rockets and rear wheel brakes, are connected to the aircraft by means of a quickly-detachable connector 251 common for the rear wheel brakes and for the rockets (Figs. 27 and 28).

The rockets arranged in the manner already explained comprising two groups of three rearwards of the posts 20, 20*a* are fired by the pilot by groups of two, symmetrically and together, one per side at the time, and the remaining pair of rockets, one per side, are left for emergency purpose and can be fired separately in case one of the grouped rockets failed to fire.

When the aircraft reaches the take-off relative velocity, the pilot must release the aircraft from the carriage by unlocking the hook element 109 of the strap device 12.

Subsequently, the aircraft takes off and tears out the detachable connector 251. During this last phase, the wings are guided by the ramps 116, and the collapsible device 24 which rises due to the pressure of its return springs 121. Shortly after the take-off the assembly has the appearance illustrated in Fig. 1. During the take-off, the brakes are controlled by the pilot either directionally or differentially on one or the other rear wheels 16, 16*a*, or simultaneously on both wheels, notably in case of emergency.

According to an advantageous form of embodiment, the rear wheel brakes may be actuated through a known hydraulic system, the energy therefor being supplied from a reservoir of compressed air. To this end, each longitudinal girder 3 and 3*a* carries a compressed-air bottle 250 (Figs. 27 and 28). The pneumatic line is connected to the aircraft through the detachable connector 251 so that the pilot will be able to control at 252 the differential braking action just as in the case of a conventional landing gear. The partly-reduced pneumatic pressure is fed to the hydraulic pump 253 of one or the other wheels 16 or 16*a*, or to the hydraulic pumps of both wheels, and converted into hydraulic pressure for actuating the brakes 254.

During the take-off the pneumatic connection 251 with the aircraft is pulled out as the aircraft is completely clear of the carriage and the venting of the pneumatic bottles 250 actuates a valve adapted to switch the pneumatic circuit to an accumulator not shown, thereby applying the brakes 254 to both rear wheels 16 and 16*a* and actuating the front axle-steering locking device.

After the aircraft has cleared the carriage the rear wheels 16, 16*a* are braked automatically, as explained hereinabove, this braking action being supplemented by that of the air-brake flap 5 urged by springs 79 to its raised position against the resistance of the dash-pot 79*a*. The stopping distance required for the carriage is reduced to a substantial extent by the low weight thereof, and the travel required from the towing vehicle for rejoining the carriage and returning same to the place where another aircraft is to be loaded is reduced accordingly. On the other hand, the flap 5 applies a vertical component to the front axle of the carriage, thereby improving the stability of the latter.

Finally, the sliding-fit mounting of the rockets on their supporting racks, due to the original structure shown in Fig. 14, affords a substantial reduction in the time interval between two successive launchings and to recover the fired rockets.

Of course, many modifications and alterations may be brought to the preferred form of embodiment shown and described herein, without departing from the scope of the invention as defined in the appended claims.

What we claim is:

1. An assembly adapted for conveying over and launching from rough ground an aircraft having a fuselage and a retractable landing gear comprising, in combination, a launching carriage displaceable over rough ground having a dismountable light weight rectangular frame structure including two longitudinal girders and two cross members, and the height of which is determined in order to move the same under the fuselage of the aircraft to be launched, a set of front steering wheels and a set of rear wheels on the carriage, main braking means associated with said rear whels for applying a braking force to the carriage, means on the aircraft connected to said main braking means for actuating the same for handling the carriage to launch the hoisted aircraft therefrom, means on the carriage for actuating said main braking means after releasing of said aircraft from the carriage, means on the carriage for securing the aircraft thereto while resting on the belly of its fuselage, supplemental propelling means supported by the carriage for moving the same to launch the aircraft, means for mounting said supplemental propelling means on the carriage, means on the aircraft connected to said propelling means for starting the same, supplemental braking means on the carriage for applying a supplemental braking force thereto after releasing of the aircraft therefrom to quickly stop said carriage, means on the carriage operable at the release of the aircraft from said carriage for actuating said supplemental braking means, a towing cross-country vehicle, a rigid coupling device universally mounted on said towing vehicle, means for connecting said coupling device to said carriage for moving the same to hoist the aircraft thereon and to convey it to a starting position to launch the hoisted aircraft, means for disconnecting said coupling device from said carriage at said starting position, said towing vehicle having a winch provided with a rope the free end of which is anchored to the bottom of the aircraft fuselage at the front thereof to hoist the aircraft on the carriage, and means on the carriage coinciding the longitudinal planes of symmetry of the carriage and of the aircraft during the hoisting operation.

2. An assembly, according to claim 1, wherein the distance existing between the two longitudinal girders of the rectangular frame structure is greater than the width of the aircraft fuselage.

3. An assembly, according to claim 1 wherein the set of front wheels comprises a steering pivot pivotally mounted on the front cross-member of the carriage, a front extended yoke mounted on the lower part of said steering pivot, a lever hingedly connected to said yoke, a hub rotatably carried by the free end of said lever and projecting on either side of the same, two wheels equipped with low pressure tires respectively mounted on the projections of said hub, and a shock-absorbing device located between said lever and said steering pivot.

4. An assembly, according to claim 3, wherein the shock-absorbing device comprises a single device having a rod bent in the shape of an arc of a circle centered on the articulation axis of the lever on the yoke, pivotally mounted on the steering pivot, passing through the lever and ending by a threaded part in its portion projecting from said lever, a nut mounted on said threaded part, a piece formed by the assembling of elastic material and of a metallic plate and interposed between said nut and said lever so that the elastic material bears on the lever, and a stacking of alternate resilient disks and metallic washers, the longitudinal shape of said disks being that of truncated wedges having their vertices directed towards the articulation axis of the lever on the yoke, said stacking being mounted around said arc-shaped rod and engaging the lever and the steering pivot.

5. An assembly, according to claim 1, wherein the set of rear wheels comprises two wheels equipped with low pressure tires and, for each wheel, a yoke having a hollow body and mounted at the rear end of the corresponding girder in register with the rear cross-member, a lever entering said hollow body and hingedly mounted on said yoke, a hub secured on the free end of said lever and projecting from said yoke towards the outside of said carriage, and a shock-absorber device located between said lever and the inner lower face of the hollow body of said yoke.

6. An assembly, according to claim 5, wherein the shock-absorbing device comprises a rod bent in the shape of an arc of a circle centered on the articulation axis of the lever on the yoke and secured on the hollow body of said yoke through which it passes, and a stacking of alternate resilient disks and metallic washers, the longitudinal shape of said disks being that of truncated wedges having their vertices directed towards the articulation axis of the lever on the yoke, said stacking being mounted around said arc-shaped rod and engaging said lever and the inner lower face of the hollow body of said yoke.

7. An assembly, according to claim 1, wherein the means for securing the aircraft to the carriage comprises means on the carriage for drivingly interconnecting said carriage and the hoisted aircraft for moving said carriage and said aircraft to launch the latter from the former, means on the carriage for longitudinally maintaining the hoisted aircraft thereon, means on the carriage for retaining the aircraft thereon, means on the aircraft for engaging said drivingly interconnecting means and said longitudinally maintaining means, means on the aircraft for engaging said retaining means and for disengaging the same as soon as the carriage with the hoisted aircraft attains the take-off speed of the latter under the action of the supplemental propelling means, and means on the carriage for protecting the aircraft releasing therefrom against said drivingly interconnecting means.

8. An assembly, according to claim 7, wherein the means for retaining the aircraft on the carriage comprises an intermediate cross-tie carried by the girders of the carriage, a vertically slidable rod mounted on said intermediate cross-tie and ended by a yoke, resilient means for driving said rod downwardly, means for connecting said rod with said intermediate cross-tie, and a pin permanently engaged in said yoke and adapted to engage a release device mounted on the hoisted aircraft, said release device being actuated by the pilot for disengaging said pin as soon as the speed of the carriage with the hoisted aircraft has reached the takeoff speed of the latter under the action of the supplemental propelling means.

9. An assembly, according to claim 7, wherein the means for drivingly interconnecting the carriage and the aircraft, for longitudinally maintaining the aircraft on the carriage and for protecting the aircraft against said drivingly interconnecting means comprise two side posts respectively mounted on the carriage girders, slightly ahead of the rear cross-member, and the height of which is such that the wings of the hoisted aircraft bear on said posts, two drivingly interconnecting pins adapted for vertical sliding motion against the action of a return spring, respectively mounted on said posts and adapted to enter housings formed under the wings of the aircraft, two ramps fixed at the rear part of said posts for guiding the wings of the aircraft releasing from the carriage, each one of said ramps having an upper part hingedly mounted on the corresponding post and a release spring driving said upper part above the corresponding driving pin when the carriage does not support any aircraft, said spring allowing said upper part to collapse under the action of the corresponding wing of the hoisted aircraft whereby the corresponding driving pin enters the housing formed under said wing, rollers carried by, and projecting from, said ramps for laterally guiding the fuselage at the take-off of the aircraft, and a third pin adapted for vertical sliding motion against the action of a return spring, secured at the front of the carriage and adapted to engage a recess formed in the bottom portion of the aircraft fuselage.

10. An assembly, according to claim 9, wherein each drivingly interconnecting pin comprises a casing secured on the corresponding post, a spring housed in said casing, a slidable pin having a shank bearing on said spring and passing through said casing, and rollers rotatably mounted in the head of said slidable pin and projecting therefrom for avoiding any sliding friction between the driving pin, the corresponding wing and the walls of the recess formed in said wing for engaging said driving pin.

11. An assembly, according to claim 1, wherein the supplemental propelling means and the means for mounting said propelling means on the carriage comprise two side posts respectively mounted on the girders of the carriage, slightly ahead of the rear cross-member, supporting devices carried by said posts, means for mounting rockets on said supporting devices, and rockets supported by said mounting means, said rockets being symmetrically disposed with respect to the longitudinal plane of symmetry of the carriage and being convergent towards the front of said carriage.

12. An assembly, according to claim 11, wherein the supporting devices and the means for mounting the rockets on said supporting devices comprise, for each rocket, a supporting tube fixed on the corresponding side post, a guide-tube carried by said supporting tube, a mounting member fixed on the rocket and formed with a part bridging said guide-tube for allowing its sliding thereon and a part bearing on the outer surface of the supporting tube, a yoke carried by said supporting tube, a pin passing through said mounting member and screwed in said yoke, and a releasable spring loaded bolt for locking said pin in rotation.

13. An assembly, according to claim 12, wherein each supporting device comprises three supporting tubes on which are respectively mounted three rockets, the rockets being fired by groups of two, one group at the left and the other group at the right, symmetrically, one rocket per side remaining available for emergency purpose and being adapted to be fired separately in case any one of the rockets pertaining to the first groups fails to fire.

14. An assembly, according to claim 1, wherein the means for actuating the main braking means and for putting the supplemental propelling means in operation comprise brake control devices actuatable by the pilot and emerging from the fuselage, brake control devices supported by the carriage and connected to the main braking means, a firing control device for the supplemental propelling devices actuatable by the pilot and emerging from the fuselage, a firing control device for the supplemental propelling devices mounted on the carriage and connected to said propelling devices, and pull-out connectors respectively interconnecting said both brake control devices and said both firing control devices.

15. An assembly, according to claim 1, wherein the supplemental braking means comprises an air-brake having a streamlined flap pivotally mounted on the front part of the longitudinal girders of the carriage ahead of the front cross-member, release pre-stressed springs interposed between said flap and said carriage for bringing said flap into its braking position inclined rearwardly at substantially 45° at the releasing of the aircraft from the carriage, and a dash-pot secured between said flap and the front cross-member for retarding the action of said release springs, said flap being brought into a horizontal position by the weight of the hoisted aircraft against the action of said release springs.

16. An assembly, according to claim 1, wherein the means for connecting the carriage to the coupling device of the towing vehicle comprises a tubular beam connected to said coupling device, a device slidably mounted on said tubular beam and simultaneously pivotally mounted about the axis of said tubular beam, said device being hingedly mounted on the carriage, a shock-absorber interposed between said tubular beam and said swiveling and sliding device, said shock-absorber being operative in both directions respectively to convey the carriage and to hoist the aircraft on the carriage, and means for rigidifying said tubular beam and said swiveling and sliding device with respect to the vehicle and to the carriage to hoist the aircraft on said carriage.

17. An assembly according to claim 16, wherein the shock-absorber comprises a series of alternate resilient rings and metallic washers housed in a casing pivotally mounted on the swiveling and sliding device, a piston located within said casing between two distinct groups of resilient rings and metallic washers and the rod of which passes through said casing, and a universal coupling connecting said rod with the tubular beam.

18. An assembly, according to claim 16, wherein the rigidifying means comprises two lateral arms, pivotally mounted on the tubular beam about vertical axes, and anchored to the towing vehicle to hoist the aircraft on the carriage, and a linkage having horizontal articulation axis, carried by the swiveling and sliding device and adapted to be connected to the front cross-member of the carriage to hoist on the carriage, whereby the towing vehicle, the connecting device and the carriage form an undeformable assembly to hoist the aircraft on the carriage, said arms being folded along the tubular beam to convey the carriage with the hoisted aircraft.

19. An assembly according to claim 16, further comprising a wheel rotatably mounted on the lower part of the tubular beam, whereby said beam and the swiveling and sliding device can be towed by the vehicle disconnected from the carriage.

20. An assembly according to claim 1, wherein the means for automatically coinciding the longitudinal planes of symmetry of the aircraft and of the carriage during the hoisting operation comprises an automatic rear centering roller guiding the aircraft through the fuselage bottom thereof and carried by the rear cross-member of the carriage, a front roller the profile of which corresponds in shape to that of the fuselage bottom to form a cradle therefor, and an articulated resilient device mounted on the front of the carriage, supporting said front roller and adapted to damping the rocking movement of the aircraft during the hoisting operation.

21. An assembly, according to claim 20, wherein the automatic rear centering roller is mounted centrally of the rear cross-member and is formed on its outer surface with two series of helical grooves having the profile of the central part of the fuselage bottom, said grooves having opposite pitches and converging towards a central annular groove.

22. An assembly according to claim 1, wherein the means for automatically coinciding the longitudinal planes of symmetry of the aircraft and of the carriage during the hoisting operation, the supplemental braking means and the means for actuating said supplemental braking means at the release of the aircraft from the fuselage comprise an automatic rear centering roller guiding the aircraft through the fuselage bottom thereof and carried by the rear cross-member of the carriage, an air-brake having a streamlined flap pivotally mounted on the front part of the longitudinal girders of the carriage ahead of the front cross-member, release pre-stressed springs interposed between said flap and said carriage for bringing said flap into its braking position inclined rearwardly at substantially 45°, a dash-pot secured between said flap and the front cross-member for retarding the action of said release springs, and a front roller the profile of which corresponds in shape to that of the fuselage bottom to form a cradle therefor, said front roller being supported by the central rear part of said flap, said flap being brought into a substantially horizontal position against the action of said release springs by the weight of the hoisted aircraft.

23. An assembly adapted for conveying over and launching from rough ground an aircraft having a fuselage and a retractable landing gear comprising, in combination, a launching carriage, means for propelling the carriage to hoist the aircraft thereon and to convey it to a starting position to launch the hoisted aircraft therefrom, means on the carriage for guiding the aircraft in the course of its hoisting thereon, means on the carriage for securing the aircraft thereto with the belly of its fuselage resting on the carriage, means on the carriage for releasing the aircraft from the carriage, braking means on the carriage for applying a braking force thereto, and supplemental propelling means supported by the carriage for moving the same to launch the aircraft.

24. An assembly adapted for conveying over and launching from rough ground an aircraft having a fuselage and retractable landing gear comprising, in combination, a launching carriage, means for propelling the carriage to hoist the aircraft thereon and to convey it to a starting position to launch the hoisted aircraft therefrom, means on the carriage for guiding the aircraft in the course of its hoisting thereon, means on the carriage for securing the aircraft thereto with the belly of its fuselage resting on the carriage, means on the carriage for releasing the aircraft from the carriage, braking means on the carriage comprising a main braking element for applying a braking force to said carriage, on the one hand, for handling the latter to launch the hoisted aircraft therefrom and, on the other hand, for stopping said carriage after releasing of the aircraft therefrom, and a supplemental braking element for applying a supplemental braking force to said carriage after releasing of the aircraft therefrom to quickly stop said carriage, means actuated by the release of the aircraft from the carriage for operating said supplemental braking element, and supplemental propelling means supported by the carriage for moving the same to launch the aircraft.

References Cited in the file of this patent

UNITED STATES PATENTS

| | | |
|---|---|---|
| 1,483,992 | Sperry | Feb. 19, 1924 |
| 2,604,279 | Gerin | July 22, 1952 |
| 2,647,776 | Wallis | Aug. 4, 1953 |
| 2,659,553 | Wallis | Nov. 17, 1953 |

FOREIGN PATENTS

| | | |
|---|---|---|
| 835,594 | France | Sept. 26, 1938 |
| 882,390 | France | Mar. 1, 1943 |
| 909,544 | France | Jan. 2, 1946 |
| 1,007,644 | France | Feb. 13, 1952 |